(No Model.) 2 Sheets—Sheet 2.

J. LONGMORE & W. L. WATSON.
MACHINE FOR DECORTICATING RHEA, &c.

No. 472,606. Patented Apr. 12, 1892.

Witnesses:
J. M. Fowler Jr
Thomas Durant

Inventors
James Longmore and
William L. Watson
By Church & Church
their Attorneys

UNITED STATES PATENT OFFICE.

JAMES LONGMORE AND WILLIAM LIVINGSTONE WATSON, OF LONDON, ENGLAND.

MACHINE FOR DECORTICATING RHEA, &c.

SPECIFICATION forming part of Letters Patent No. 472,606, dated April 12, 1892.

Application filed October 8, 1891. Serial No. 408,197. (No model.) Patented in England May 12, 1890, No. 7,389.

*To all whom it may concern:*

Be it known that we, JAMES LONGMORE and WILLIAM LIVINGSTONE WATSON, both subjects of the Queen of England, residing at London, in England, have invented certain new and useful Improvements in Machines for Decorticating Rhea, Jute, and other Fibrous Vegetable Stems, (for which we have obtained Letters Patent of Great Britain, No. 7,389, dated May 12, 1890,) of which the following is a specification.

Hitherto the machines used for the decortication of rhea, jute, and other fibrous vegetable stems have usually been of complicated and costly construction and have not generally been arranged for operating continuously. Besides this, many of the machines have proved faulty in use, because, among other reasons, the gummy nature of the fibers has caused them to adhere to the rollers, traveling aprons, or other parts of the machine, and thus interfere with their proper delivery.

Now this invention has for its object to construct a machine in such a manner as to combine simplicity and cheapness of construction with continuity and reliability of operation, and also so as to considerably increase the output of such machines.

A machine constructed according to the present invention consists, essentially, of three rollers and a fixed bar, over which one of the rollers—viz., a fluted or ribbed beating-roller—breaks the woody interior of the stems into small pieces and loosens it in the surrounding fibrous epidermis, so that it may subsequently be easily shaken out therefrom. Of the other two rollers, the upper one is serrated or otherwise roughened and the lower one is smooth and works very close to and preferably in frictional contact with the fixed bar, so that the said bar will scrape off any particles of the stems which adhere to the lower roller. Two traveling aprons are preferably provided, one to deliver the unbroken stems regularly to the two superposed or feed rollers and the other to take away from the beater the stems of fibers after they have been operated upon by said beater, the latter apron being also arranged to remove from the lower feed-roller any particles of the stem which the fixed bar may have failed to detach from said roller.

Figure 1:
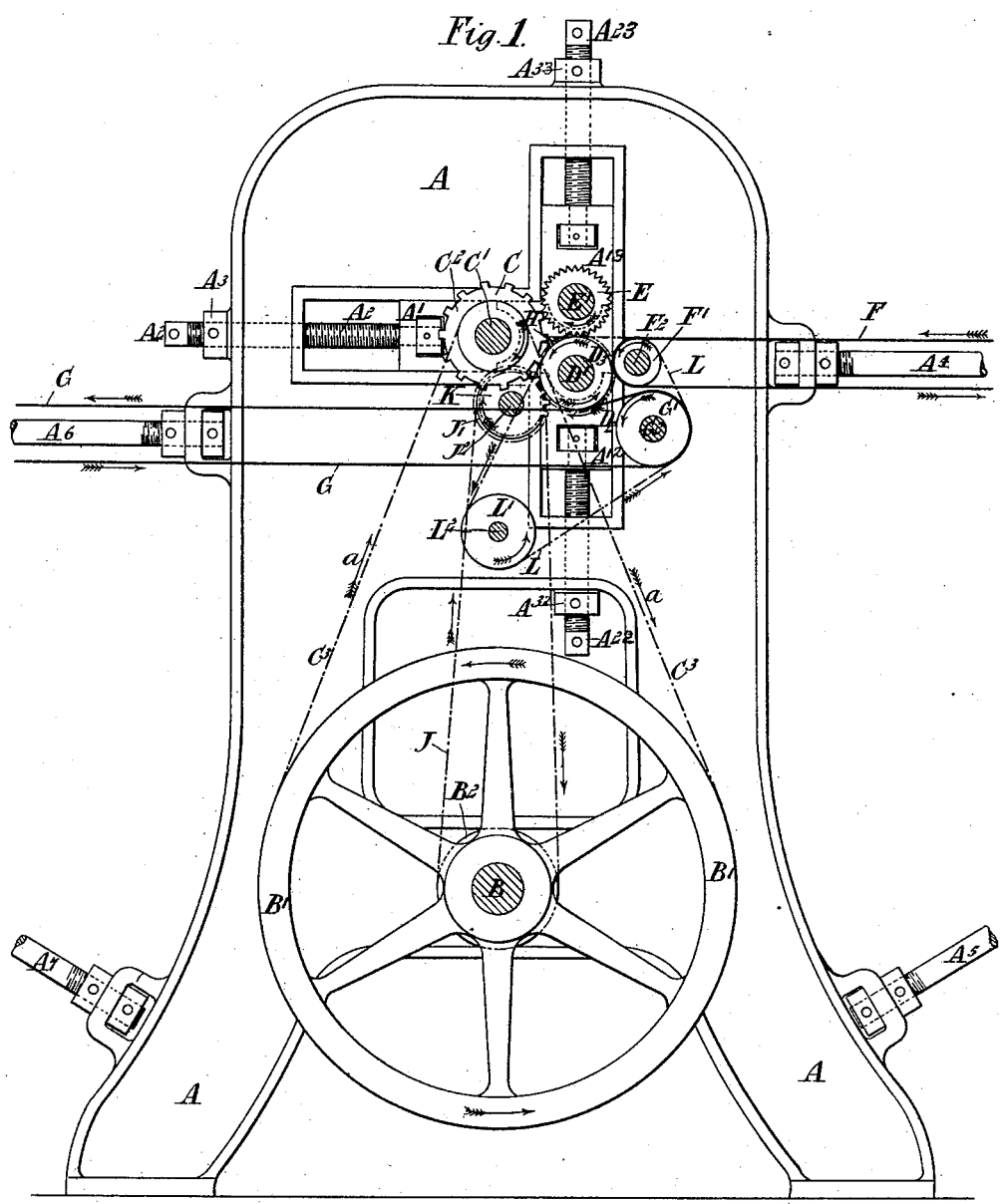
Figure 2:
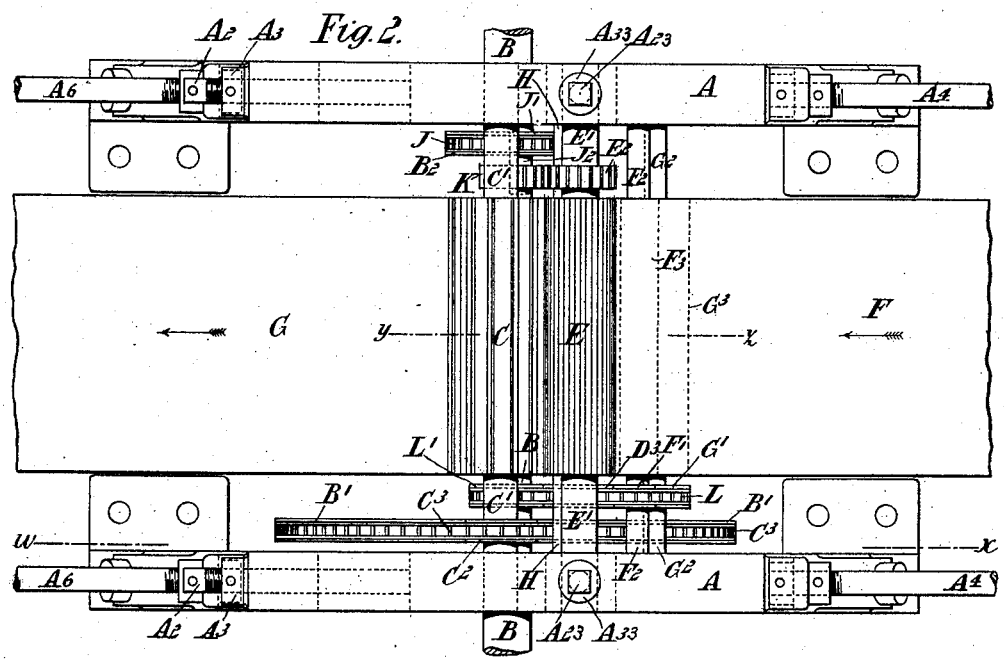
Figure 3:
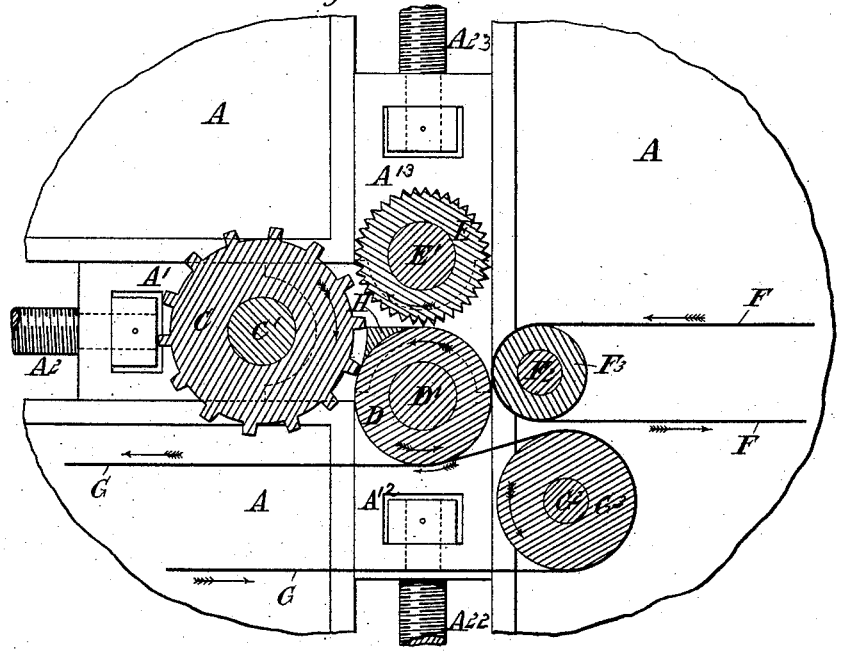

In the accompanying drawings, Figures 1 and 2 are respectively a vertical section and a plan of a machine constructed according to this invention, the section, Fig. 1, being taken on the line $wx$ of Fig. 2. Fig. 3 is a section, drawn to a larger scale, taken on the line $yz$ of Fig. 2.

Like letters indicate like parts throughout the drawings.

A are the two side frames, which support the various parts of the machine, and B is the main shaft, to which rotary motion is imparted in any suitable manner.

B' is a pitch-wheel at one side (the "near" side, as in Figs. 1 and 2) of the machine, secured on shaft B and of comparatively large diameter, so as to drive the beater C at the required high rate of speed. On this shaft B, at the other or "far" side of the machine, as in Figs. 1 and 2, is another pitch-wheel $B^2$ of smaller diameter than the before-mentioned wheel B' for driving the feed-rollers D and E and the feeding and delivering aprons F and G at the required rate of speed, which is preferably considerably slower than that of the beater C.

The shaft C' of the beater at the near side of the machine has secured on it the pitch-wheel $C^2$, over which passes the chain $C^3$, which is driven in the direction of the arrows $a$, Fig. 1, by the wheel B', and the said shaft is supported in two bearing-blocks A', each of which is adjustable by a screw $A^2$ in one of the side frames A. This adjustment enables the beater C to be moved nearer to or farther from the feed-rollers D and E and fixed bar H, and when so adjusted the beater can be retained in such adjusted position by lock-nuts $A^3$ on the screws $A^2$.

The shafts D' and E' of the rollers D and E, like that of the beater C, are each supported in adjustable bearing-blocks $A^{12}$ or $A^{13}$, these being movable up and down each by its screw $A^{22}$ or $A^{23}$, which may be secured in any desired position by means of the lock-nut $A^{32}$ or $A^{33}$, threaded upon it.

J is a chain which, driven by the pitch-wheel $B^2$, transmits motion to the wheel J'. This wheel is mounted on a shaft $J^2$, carried by one of the frames A, the said shaft also having mounted on it the toothed wheel or pinion K, which rotates in unison and may be integral with the wheel J'. The wheel K gears with the wheel D², Fig. 1, secured on the far end of the feed-roller shaft D', and the wheel D² gears with the wheel E², Fig. 2, secured on the adjacent end of the feed-roller shaft E' above it.

The bar H may have its ends turned down and secured to the lower feed-roller bearing-blocks A¹², as shown in dotted lines, Figs. 3 and 2, so as to be adjustable with said blocks, or it may be supported in any other convenient manner. It passes across the machine in the space between the three rollers C, D, and E and it is practically of triangular section. Its upper surface may be horizontal and its nearly vertical surface is hollowed out to enable the beater C to work close against it, while its third or under surface is hollowed out to enable it to fit closely against the roller D, so as to "doff" it or scrape off or prevent any particles of the stems adhering thereto. This hollowing out of the under side of bar H enables it to be bedded on the roller D, so that said roller D will support it against the blows of the beater, and thus avoid the necessity of employing a thicker bar, which would necessitate the distance between the beater C and rollers D and E being increased. This is an important feature of the invention, as it is necessary to have the beater C as close as possible to the rollers D and E, so as to operate upon practically the whole length of the fiber with its full effect.

On the near end of the roller-shaft D' is secured a pitch-wheel D³, around which passes a chain L, which gears with and transmits motion to the wheels F' and G', secured, respectively, on the shafts F² and G² of the rollers F³ G³, which give motion to the endless aprons F and G, respectively. Besides the wheels D³ F' G' the chain L passes around the wheel L', which is mounted on a short shaft or stud L², Fig. 1, secured to the near frame A, and which may be adjustable, so as enable the tension of the chain L to be regulated. The shafts F² and G² may be supported in stationary bearings formed in the two frames A, or they may be arranged in slots or guides, so as to be capable of adjustment nearer to or farther from the lower feed-roller D, so as to admit of larger or smaller apron-rollers being applied for the purpose of operating the aprons F and G quicker or slower.

The roller F' causes the apron F to travel in close proximity to, but not necessarily in contact with, the feed-roller D. The outer part of the apron F, which part is not shown in the drawings, passes around another roller, which may be supported at the junction of the bolt A⁴ with A⁵, which may be adjusted so as to slacken or tighten said apron.

The roller G' causes the apron G to travel in contact with the feed-roller D, so as to rub off from its surface any particles of the stems or fibers which the bar H may have failed to scrape off. The parts of the roller D and apron G in contact with each other travel in opposite directions, as will be seen by the arrows in Figs. 1 and 3. The outer part of the apron G, like that of the apron F, passes over a roller, not shown in the drawings, but which may be supported at the junction of the tie-bolt A⁶ with A⁷, which bolts provide for any required adjustment in the tension of such apron.

The operation of the before-described apparatus is as follows: The stems to be treated are laid longitudinally on the apron F, so that they will be carried endwise to the rollers D and E, between which they are nipped, and by which they are fed to the beater C. The rollers D and E merely nip the stems sufficiently to feed them regularly to the beater and to prevent their being dragged between said rollers by the action of the beater, and it is preferable to adjust the rollers D and E by means of the screws A², so that the stems may not be crushed between them any more than is necessary for fulfilling these functions. The stems are passed by the rollers D and E over the bar H, at the distant edge of which they are broken by a continuous and rapid succession of blows from the ribs or blades of the beater C. This breaks up the woody interior of the stems into fine particles and loosens it within the epidermis, which is left practically whole, and out of which the said interior may afterward be easily removed by shaking the stems. Any particles of the pellicle or other gummy fragments which escape the scraping action of the bar H will be removed from the roller D by the apron G, which, as already explained, travels in the reverse direction to the contiguous portion of the periphery of D, and which will convey said particles out of the machine along with the treated stems.

One very great advantage secured by the before-described machine is that practically the whole length of the stem is uniformly operated on by the beater C, no portion of the stems being in practice found to have escaped treatment.

We claim—

1. In a decorticating-machine, the combination, with the beater and smooth feed-roller, of a relatively small brake-bar partially surrounding and taking a bearing on the roll, so as to be centrally supported thereby against the blows of the beater, substantially as described.

2. In a decorticating-machine, the combination, with the beater and the adjustable feed-roller, of a relatively small brake-bar carried by the roller-bearings, whereby it is adjusted in unison therewith, and taking a bearing on the roller, whereby it is supported centrally against the blows of the beater, substantially as described.

3. In a decorticating-machine, the combination, with the beater C, feed-rollers D and E, and a bar, such as H, in contact with the roller D and over which the stems are broken by the beater, of an endless apron, such as G, traveling in contact with the roller D, so as to remove any particles of the stems adhering thereto, substantially as described.

4. The combination and arrangement of parts constituting the complete decorticating-machine, consisting, essentially, of a beater C, a plain or smooth feed-roller D, a serrated or roughened feed-roller E, feed and delivery aprons F and G, and a bar, such as H, supported on the roller D, the whole operating substantially as and for the purpose described.

In testimony whereof we have hereto set our hands in the presence of the two subscribing witnesses.

JAMES LONGMORE.
WILLIAM LIVINGSTONE WATSON.

Witnesses to the signature of James Longmore:
JOSEPH G. NODEN,
THOS. HEATH.

Witnesses to the signature of William Livingstone Watson:
JNO. D. TANNALINE,
G. F. WARREN.